United States Patent
Loginov et al.

(10) Patent No.: US 10,691,984 B2
(45) Date of Patent: Jun. 23, 2020

(54) METHOD AND APPARATUS FOR DETERMINING A DOCUMENT SUITABILITY FOR OPTICAL CHARACTER RECOGNITION (OCR) PROCESSING

(71) Applicant: ABBYY PRODUCTION LLC, Moscow (RU)

(72) Inventors: Vasily Loginov, Moscow Region (RU); Ivan Zagaynov, Moscow Region (RU)

(73) Assignee: ABBYY Production LLC, Moscow (RU)

( * ) Notice: Subject to any disclaimer, the term of this patent is extended or adjusted under 35 U.S.C. 154(b) by 492 days.

(21) Appl. No.: 15/377,118

(22) Filed: Dec. 13, 2016

(65) Prior Publication Data

US 2018/0157907 A1    Jun. 7, 2018

(30) Foreign Application Priority Data

Dec. 6, 2016 (RU) .................... 2016147699

(51) Int. Cl.
*G06K 9/66* (2006.01)
*G06K 9/00* (2006.01)
*G06K 9/40* (2006.01)

(52) U.S. Cl.
CPC .......... *G06K 9/66* (2013.01); *G06K 9/00442* (2013.01); *G06K 9/40* (2013.01); *G06K 2209/01* (2013.01)

(58) Field of Classification Search
None
See application file for complete search history.

(56) References Cited

U.S. PATENT DOCUMENTS

| 5,537,483 | A | 7/1996 | Stapleton et al. |
| 9,576,210 | B1 * | 2/2017 | Liu .................... G06T 5/003 |
| 2003/0086615 | A1 * | 5/2003 | Dance ............ G06K 9/00456 382/200 |
| 2009/0022397 | A1 | 1/2009 | Nicholson |
| 2009/0141932 | A1 | 6/2009 | Jones et al. |
| 2012/0063690 | A1 | 3/2012 | Ashok et al. |

(Continued)

FOREIGN PATENT DOCUMENTS

RU    2571616 C1    12/2015

OTHER PUBLICATIONS

Russian Federation Patent Application No. 2016147699/08 Office Action dated Jul. 13, 2017, 16 pgs.

*Primary Examiner* — Bernard Krasnic
(74) *Attorney, Agent, or Firm* — Lowenstein Sandler LLP (57) ABSTRACT

There is disclosed a method of determining a digital document suitability for OCR processing, the method executable by a user electronic device, the user electronic device configured for capturing a digital image of a document. The method comprises: acquiring by the user electronic device, the digital image of the document; determining, by a classifier executed by the user electronic device, an OCR suitability parameter associated with the digital image, the OCR suitability parameter indicative of whether the digital image is suitable for producing an output of the OCR processing of an acceptable quality, the classifier having been trained to determine the OCR suitability parameter at least partially based on a level of noise associated with the digital image; in response to the OCR suitability parameter being below a pre-determined threshold, causing the user electronic device to re-acquire the digital image.

28 Claims, 5 Drawing Sheets

(56) References Cited

U.S. PATENT DOCUMENTS

| | | | |
|---|---|---|---|
| 2013/0120595 A1* | 5/2013 | Roach | H04N 5/225 |
| | | | 348/207.1 |
| 2013/0155474 A1* | 6/2013 | Roach | G06Q 20/322 |
| | | | 358/505 |
| 2014/0032406 A1 | 1/2014 | Roach et al. | |
| 2014/0086455 A1* | 3/2014 | Kotovich | G06K 9/036 |
| | | | 382/112 |
| 2014/0111638 A1* | 4/2014 | Isakov | H04N 5/23222 |
| | | | 348/135 |
| 2015/0310291 A1* | 10/2015 | Cuthbert | G06K 9/18 |
| | | | 382/182 |
| 2016/0188993 A1 | 6/2016 | Beato | |
| 2016/0203124 A1* | 7/2016 | Cuthbert | G06F 17/2854 |
| | | | 704/2 |

\* cited by examiner

METHOD AND APPARATUS FOR DETERMINING A DOCUMENT SUITABILITY FOR OPTICAL CHARACTER RECOGNITION (OCR) PROCESSING

CROSS REFERENCE TO RELATED APPLICATIONS

The present application claims the benefit of priority under 35 USC 119 to Russian Patent Application No. 2016147699, filed Dec. 6, 2016; the disclosure of which is incorporated herein by reference in its entirety for all purposes.

FIELD

The present technology relates to computer-implemented methods and systems for document processing in general and specifically to a method and an apparatus for determining document suitability for OCR processing.

BACKGROUND

Printed natural-language documents continue to represent a widely used communications medium among individuals, within organizations, and for distribution of information among information consumers. With the advent of ubiquitous and powerful computational resources, including personal computational resources embodied in smart phones, pads, tablets, laptops, and personal computers, as well as larger-scale computational resources embodied in cloud-computing facilities, data centers, and higher-end servers within various types of organizations and commercial entities, natural-language information is, with increasing frequency, encoded and exchanged in electronic documents.

Printed documents are essentially images, while electronic documents contain sequences of numerical encodings of natural-language symbols and characters. Because electronic documents provide advantages in cost, transmission and distribution efficiencies, ease of editing and modification, and robust-storage over printed documents, an entire industry supporting methods and systems for transforming printed documents into electronic documents has developed over the past 50 years.

Computational optical-character-recognition methods and systems and electronic scanners together provide reliable and cost-effective imaging of printed documents and computational processing of the resulting digital images of text-containing documents to generate electronic documents corresponding to the printed documents.

With the advent of camera-containing smart phones and other mobile, processor-controlled imaging devices, digital images of text-containing documents can be generated by a large variety of different types of ubiquitous, hand-held devices, including smart phones, inexpensive digital cameras, inexpensive video surveillance cameras, and imaging devices included in mobile computational appliances, including tablets and laptops.

Digital images of text-containing documents produced by these hand-held devices and appliances can then be processed, by computational optical-character-recognition systems, including optical-character-recognition applications (also referred to Optical Character Recognition (OCR) processing) in smart phones or those implemented on a server, to produce corresponding electronic documents.

In the locally-implemented OCR processing function, the hand-held device can implement the OCR function and process the digital image to produce a recognized text document. Alternatively, the digital image captured by the user electronic device (either in a compressed form or as is) is transmitted, via a communication network, to a server of the optical-character-recognition systems for performing the server-based OCR function. The server then (i) receives the digital image, (ii) de-compresses the compressed digital image to obtain a de-compressed digital image (in those scenarios where the image is transmitted in a compressed form between the hand held device and the server), and (iii) executes the server-based OCR function to generate a recognized text document based on the digital image, the recognized text document based containing text generated on the basis of the digital image. The server can then transmit back the recognized text document to the user electronic device via the communication network (in an original or a compressed state thereof).

Typically, the locally-executed OCR function tends to result in a lower quality of the output of the OCR compared to the server-based OCR function (as the locally-executed OCR systems tend to be less complex than the server-executed OCR systems due to the typically limited computational resources available on the hand-held device compared to the server dedicated to the server-based OCR function).

In either case, whether the OCR function is executed locally or on the server, the OCR function involves some degree of pre-processing of the digital image in order to reduce the number of artefacts in the digital image (i.e. reducing noise, reducing optical blur, etc.). As part of the OCR function, either the hand-held device or the server executes a binarization and computational-intensive OCR routines.

SUMMARY

It is an object of the present technology to ameliorate at least some of the inconveniences present in the prior art.

Embodiments of the present technology have been developed based on the inventors' appreciation that there exists at least one technical problem within the prior art approaches to executing the local or server-based OCR function. Without wishing to be bound to any particular theory, inventors have appreciated that it may be desirable to process the digital image (to be OCR processed, either by a locally-executed or server-based OCR function) before executing the OCR processing (either by a locally-executed or server-based OCR function) in order to determine the digital document suitability for the OCR processing (either by a locally-executed or server-based OCR function).

Determination of the suitability of the digital document for OCR processing, broadly speaking, is a determination whether the digital document, once processed by the OCR function (whether locally-executed or server-based) is likely to produce an output (i.e. a recognized text digital document) of an acceptable quality or not (and in case of the unacceptable quality of the output to require, for example, the user to re-generate the digital image of the document). Acceptable quality can, as an example (but not so limited), be measured in the number of errors contained in the recognized text document (as a maximum number of errors per page or overall errors per document).

The reason for and the benefit of such OCR suitability pre-determination depends (at least in part) on whether the OCR function is executed locally at the hand-held device or on the server.

For those scenarios, where the OCR function is executed locally, ability to pre-process a given digital image to determine its suitability for OCR processing allows the hand-held device to cause, in case of the given digital image is determined as not being suitable for OCR processing, a user associated with the hand-held device to re-acquire the digital image. In other words, if it is determined that the given digital image is likely to render an output of the locally-executed OCR function of an unacceptable quality, the user can be prompted to re-acquire the digital image before it is OCR processed. This, in turn, can result in a more satisfactory output of the OCR function being obtained in a comparatively shorter period of time (especially when the originally captured digital image would not result in the output of the OCR function of a suitable quality). Broadly speaking, embodiments of the present technology can improve final recognition quality degree with the locally-executed OCR function compared to those prior art solutions that do not implement OCR suitability pre-processing, potentially resulting in rendering an output of the locally-executed OCR function of an unacceptable quality, requiring the user to assess himself the unacceptable quality of the output of the OCR function and to start the image capturing and recognition process de novo.

Embodiments of the present technology may also result in reduced computational resources required before OCR processing (and/or during OCR processing), which can result in saving of a battery life of the electronic device (such as the hand-held device battery).

In those scenarios where the OCR function is implemented on the server, local determination of the OCR suitability of the digital document for the server-based OCR function to render an output of the suitable quality allows to potentially save on the time required to generate the output of the acceptable quality, to save on the used bandwidth of a communication network used to send the digital image back and forth between the hand-held device and the server, etc. For example, compared to those prior art solutions that do not implement OCR suitability pre-processing, where the digital file would be sent to the server to be OCR processed, receiving the output of the server-based OCR function of an unacceptable quality (and thus having to assess the unacceptable quality of the output of the OCR function and to start the image capturing and recognition process de novo in view of undesirable final recognition results), the embodiments of the present technology allow reducing overall time required for receiving the output of acceptable quality from the server-based OCR function (especially in those scenarios where the original digital image was not suitable for producing an output of the server-based OCR function of an acceptable quality).

Without wishing to be bound by any specific theory, the inventors have further appreciated that the suitability of the digital image for OCR processing (whether locally-executed or server-based) correlates to a level of image noise in the digital image. Inventors have further appreciated that a level of low local contrast can additionally (or alternatively) correlate well to the quality of the output of the OCR processing. Based on this appreciation, inventors have addressed the above-identified shortcoming of the prior art approaches by developing a method of determining, at the user electronic device and prior to transmitting the digital image to the server (in case of the server-based OCR processing) or prior to processing of the digital image by the locally-executed OCR function, an OCR suitability parameter associated with the captured digital image.

Broadly speaking, the OCR suitability parameter is indicative of whether the digital image is suitable to render an acceptable outcome by the server-based OCR processing. In accordance with embodiments of the present technology, the OCR suitability parameter is determined at least in part based on the level of image noise associated with the digital image.

Some embodiments of the present technology can be implemented in a cloud computing environment. Cloud computing is a type of Internet-based computing that provides shared computer processing resources and data to computers and other devices on demand. It is a model for enabling ubiquitous, on-demand access to a shared pool of configurable computing resources (e.g., computer networks, servers, storage, applications and services), which can be rapidly provisioned and released with minimal management effort. Cloud computing and storage solutions provide users and enterprises with various capabilities to store and process their data in third-party data centers that may be located far from the user-ranging in distance from across a city to across the world.

In accordance with a first broad aspect of the present technology there is provided a method of analyzing a digital image. The method is executable by a user electronic device. The the method comprises: acquiring by the user electronic device, the digital image of the document; determining, by a classifier executed by the user electronic device, an OCR suitability parameter associated with the digital image, the OCR suitability parameter being indicative of whether the digital image is suitable for producing an output of the OCR processing of an acceptable quality, the classifier having been trained to determine the OCR suitability parameter at least partially based on a level of noise associated with the digital image; in response to the OCR suitability parameter being below a pre-determined threshold, causing the user electronic device to re-acquire the digital image.

In some implementations of the method, the method further comprises, in response to the OCR suitability parameter being above the pre-determined threshold, causing executing the OCR processing of the digital image.

In some implementations of the method, the causing executing the OCR processing comprises executing, by the user electronic device, a locally-executed OCR function to generate a recognized text digital document representative of a text contained in said digital image.

In some implementations of the method, the causing executing the OCR processing comprises transmitting, by the user electronic device, to a server, the server configured to execute a server-based OCR function to (i) generate a recognized text digital document representative of a text contained in said digital image and (ii) transmit the recognized text document to the user electronic device.

In some implementations of the method, the classifier is implemented as a machine learning algorithm.

In some implementations of the method, the method further comprises training the machine learning algorithm.

In some implementations of the method, the determining the OCR suitability parameter comprises: generating, from a grayscale digital image version of the digital image, a contour image; splitting a grayscale digital image into non-overlapping blocks; determining an average contrast Ci in each block of the grayscale digital image; generating a binary version of the non-overlapping blocks of the grayscale digital image in order to determine contour pixels; determining text blocks; determining contrast $C^1_i$ of sharp pixels of low-contrast blocks; determining contrast $C^2_i$ of background pixels of low-contrast blocks; determining an average values of $<C_i><C^1_i><C^2_i>$ of low-contrast blocks; determining an error level R.

In some implementations of the method, the error level R is used as the OCR suitability parameter.

In some implementations of the method, the generating the contour image comprises applying a filter to the grayscale digital image.

In some implementations of the method, the filter is an edge detection algorithm.

In some implementations of the method, the edge detection algorithm is a Sobel filter.

In some implementations of the method, the splitting the grayscale digital image into non-overlapping blocks comprises selecting a size of the non-overlapping blocks such that brightness, noise and blur do not significantly vary within a given block.

In some implementations of the method, the determining an average contrast Ci in each block of the grayscale digital image comprises executing a histogram-based analysis for determining the contrast value Ci for the given block.

In some implementations of the method, the executing the histogram-based analysis comprises generating a brightness histogram, and wherein the method further comprises identifying a minimum and a maximum value of a brightness value such that 0.1% of all pixels of the given block have brightness lesser than the minimum value and 0.1% of all pixels of the given block have brightness higher than the maximum.

In some implementations of the method, the determining the average contrast Ci in each block further comprises determining a difference between the maximum value and the minimum value.

In some implementations of the method, the generating binary version of the blocks of the grayscale digital image in order to determine contour pixels comprises applying a binarization threshold of a half-sum of the maximum brightness value and the minimum brightness value of a given block using: th=½ (Cmin+Cmax), where: th is the binarization threshold; Cmax is the maximum brightness value; and Cmin is the minimum brightness value.

In some implementations of the method, the method further comprises determining a number K of binarized contour pixels of the binarized image within the given block.

In some implementations of the method, the determining text blocks comprises determining a given text block based on at least one of: (i) contour binary pixels exceeding a pre-determined proportion of all pixels in the given block, (ii) a ratio of black pixels in the binarized image being lower than a predetermined threshold and (iii) a contrast Ci value to be below a pre-determined level.

In some implementations of the method, the method further comprises selecting a subset of low-contrast text blocks.

In some implementations of the method, the determining contrast $C^1_i$ of sharp pixels of low-contrast blocks comprises determining the contrast $C^1_i$ by decreasing a value thereof down from a value 255 until a sum of the number of sharp pixels in the contour image corresponding to a given block is greater than or equal to a number of contour pixels K computed from the binary version of the given block.

In some implementations of the method, the determining contrast of background pixels $C^2_i$ of low-contrast blocks comprises determining the value of $C^2_i$ as a number of noisy contour pixels the brightness of which erroneously exceeded $C^2_i$ in the background areas.

In some implementations of the method, the determining contrast of background pixels $C^2_i$ of low-contrast blocks comprises: determining a number of background binary pixels of the binarized digital image by subtracting a number of contour pixels K from a total number of pixels in the given block.

In some implementations of the method, the method further comprises determining the value of the $C^2_i$ by increasing the value up from zero until a number of the background pixels of the contour image becomes equal or for the first time exceeds a pre-defined proportion P of the number of background binary pixels of the given block.

In some implementations of the method, the determining an error level R comprises determining the error level R as: $R=<C^1_i>/<C^2_i>$.

In some implementations of the method, the determining the error level R further comprises using statistical information: ($<C_i>$, $<C^1_i>$, $<C^2_i>$, $<R_i>$, min($R_i$)).

In some implementations of the method, the acquiring by the user electronic device, the digital image of the document is executed via an image-capturing interface of the user electronic device.

In accordance with another broad aspect of the present technology, there is provided a user electronic device comprising a processor. The processor is configured to: acquire a digital image of a document; the processor being further configured to: determine, by executing a classifier, an OCR suitability parameter associated with the digital image, the OCR suitability parameter being indicative of whether the digital image is suitable for producing an output of the OCR processing of an acceptable quality, the classifier having been trained to determine the OCR suitability parameter at least partially based on a level of noise associated with the digital image; in response to the OCR suitability parameter being below a pre-determined threshold, causing the digital image to be re-captured.

In accordance with another broad aspect of the present technology, there is provided a non-transitory computer readable medium storing computer executable instructions, the computer executable instructions, when executed, configured to cause an electronic device associated with the non-transitory computer readable medium to execute: acquiring, by the user electronic device, the digital image of the document; determining, by a classifier executed by the user electronic device, an OCR suitability parameter associated with the digital image, the OCR suitability parameter being indicative of whether the digital image is suitable for producing an output of the OCR processing of an acceptable quality, the classifier having been trained to determine the OCR suitability parameter at least partially based on a level of noise associated with the digital image; in response to the OCR suitability parameter being below a pre-determined threshold, causing the user electronic device to re-acquire the digital image.

In the context of the present specification, a "server" is a computer program that is running on appropriate hardware and is capable of receiving requests (e.g., from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server". In some embodiments of the present technology, the server can be implemented as part of a cloud-based computing system.

In the context of the present specification, "electronic device" (or a "user electronic device") is any computer hardware that is capable of running software appropriate to the relevant task at hand. Thus, some (non-limiting) examples of electronic devices include personal computers (desktops, laptops, netbooks, etc.), smartphones, and tablets and etc. It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "computer readable information storage medium" (or a "data storage device") is intended to include media of any nature and kind whatsoever, including RAM, ROM, disks (CD-ROMs, DVDs, floppy disks, hard drivers, etc.), USB keys, solid state-drives, tape drives, etc.

As for implementations of the present technology, each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
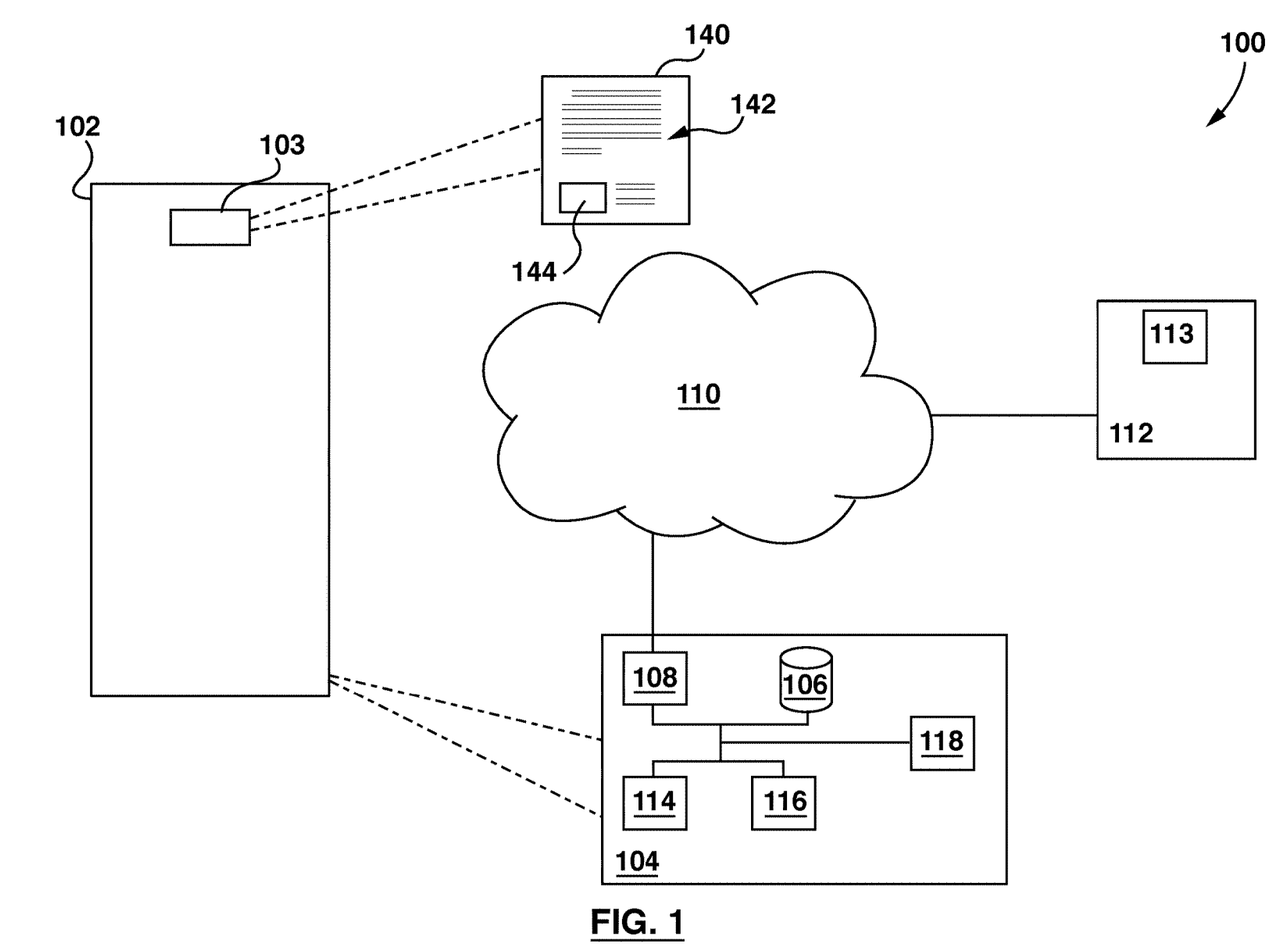
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid for better understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid for better understanding. As persons skilled in the art would understand, various implementations of the present technology may be of a greater complexity.

The system 100 comprises a user electronic device 102. The implementation of the user electronic device 102 is not particularly limited, but as an example, the user electronic device 102 may be implemented as a personal computer (desktops, laptops, netbooks, etc.), a wireless communication device (such as a smartphone, a cell phone, a tablet and the like). In the embodiment depicted in FIG. 1, the user electronic device 102 is implemented as a wireless communication device.

The user electronic device 102 is associated with an image-capturing interface 103. Broadly speaking, the image-capturing interface 103 comprises hardware (and associated software, if needed) for capturing a digital image. The digital image can be, for example, a digital image of a printed document 140 containing a text 142 (and potentially non-text items, such as an image 144). Naturally, the printed document 140 can contain one or more pages, some or all of the one or more pages having different text 142 (including an overlapping text), different images 144, different layouts, different fonts, font sizes, etc.

Figure 5:
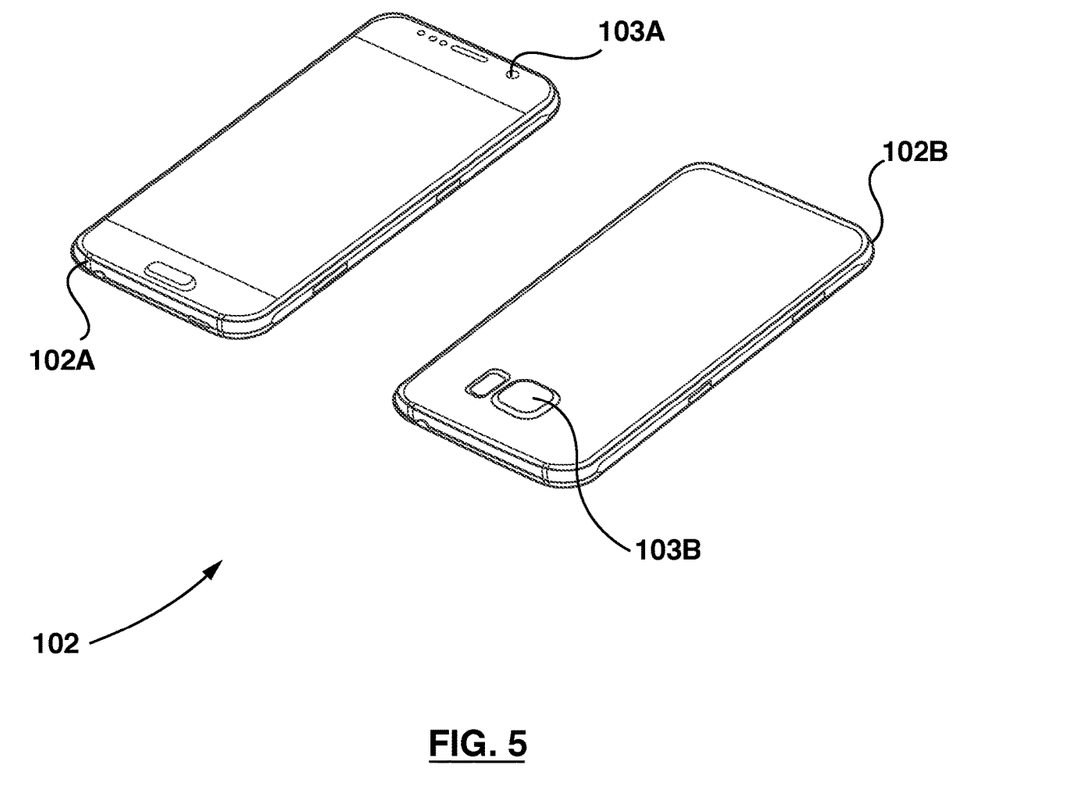
FIG. 5 depicts a front face of the electronic device of the system of FIG. 1 and a back face of the electronic device of the system of FIG. 1.

In the embodiment depicted in FIG. 1, the image-capturing interface 103 is implemented as a camera (it is noted that in some embodiments, the image-capturing interface 103 can be implemented as multiple cameras with one or more located on a front face depicted in FIG. 1 and/or one or more located on a back face, which is not depicted, of the user electronic device 102). With brief reference to FIG. 5, there is depicted a front face of the electronic device 102A and a back face of the electronic device 102B. The front face of the electronic device 102A comprises a front face camera 103A and the back face of the electronic device 102B comprises a back face camera 103B. The back face camera 103B can be more convenient for capturing the digital image of the printed document 140. However, when the description below refers to the "camera" it applies to either one (or both) of the front face camera 103A or the back face camera 103B.

In an alternative non-limiting embodiment, the image-capturing interface 103 can be implemented as a scanner (not depicted) or any other image-capturing device (not depicted) for acquiring a digital version of a paper-based document.

As schematically depicted in FIG. 1, the user electronic device 102 comprises a processor 104. The processor 104 may comprise one or more processors and/or one or more microcontrollers configured to execute instructions and to carry out operations associated with the operation of the user electronic device 102. In various embodiments, the processor 104 may be implemented as a single-chip, multiple chips and/or other electrical components including one or more integrated circuits and printed circuit boards. The processor 104 may optionally contain a cache memory unit (not depicted) for temporary local storage of instructions, data, or computer addresses. By way of example, the processor 104 may be implemented as one or more processors or one or more controllers dedicated for certain processing tasks of the user electronic device 102 or a single multi-functional processor or controller.

The processor has access to a data storage device 106. The data storage device 106 may encompass one or more storage media and generally provide storage for data, computer code, and the like. By way of example, the data storage device 106 may include various tangible computer-readable storage media including Read-Only Memory (ROM) and/or Random-Access Memory (RAM). The data storage device 106 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to the processor 104.

The data storage device 106 may store inter alia a series of computer-readable instructions, which instructions when executed cause the processor 104 (as well as other components of the user electronic device 102) to execute the various operations described herein.

In various embodiments of the present technology, various components of the user electronic device 102 may be operably connected together by one or more buses (including hardware and/or software), the buses not being separately numbered. As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit (I²C) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

The processor 104 has access to a network interface 108. The network interface 108 (which can be implemented as a network card or the like) is communicatively coupled to a communication network 110 for accessing one or more network nodes coupled thereto (such as a server 112). In some non-limiting embodiments of the present technology, the communication network 110 can be implemented as the Internet. In other embodiments of the present technology, the communication network 110 can be implemented differently, such as any wide-area communication network, local-area communication network, a private communication network and the like.

How a communication link (not separately numbered) between the network interface 108 and the communication network 110 is implemented will depend inter alia on how the user electronic device 102 is implemented. Merely as an example and not as a limitation, in those embodiments of the present technology where the user electronic device 102 is implemented as a wireless communication device (such as a smartphone), the communication link can be implemented as a wireless communication link (such as but not limited to, a 3G communication network link, a 4G communication network link, Wireless Fidelity, or Wi-Fi® for short, Bluetooth® and the like). In those examples where the user electronic device 102 is implemented as a notebook computer, the communication link can be either wireless (such as Wireless Fidelity, or WiFi® for short, Bluetooth® or the like) or wired (such as an Ethernet based connection).

The server 112 can be implemented as a conventional computer server. In an example of an embodiment of the present technology, the server 112 can be implemented as a Dell™ PowerEdge™ Server running the Microsoft™ Windows Server™ operating system. Needless to say, the server 112 can be implemented in any other suitable hardware and/or software and/or firmware or a combination thereof. In the depicted non-limiting embodiment of present technology, the server 112 is a single server. In alternative non-limiting embodiments of the present technology, the functionality of the server 112 may be distributed and may be implemented via multiple servers.

The implementation of the server 112 is well known to the person skilled in the art of the present technology. However, briefly speaking, the server 112 comprises a communication interface (not depicted) structured and configured to communicate with various entities (such as the user electronic device 102 and other devices potentially coupled to the communication network 110). The server 112 further comprises at least one computer processor (not depicted) operationally connected with the communication interface and structured and configured to execute various processes to be described herein.

In accordance with embodiments of the present technology, either one or both of the user electronic device 102 and the server 112 can implement a respective OCR processing function. It is noted, however, that in those embodiments of the present technology, where the OCR processing function is executed on the user electronic device 102, the server 112 can be omitted.

The user electronic device 102 can execute a locally-executed OCR function 118. The locally-executed OCR function 118 can be implemented as Mobile OCR SDK OCR function.

The server 112 can execute a server-based OCR function 113, which can be implemented as ABBYY Recognition Server™ OCR function.

In order to simplify the description presented herein below, the locally-executed OCR function 118 and the server-based OCR function 113 will be jointly referred to as the OCR function 113, 118. In other words, when the description herein below refer to the OCR function 113, 118, one should understand that the OCR function so-referred to can be one of the locally-executed OCR function 118 and the server-based OCR function 113.

In accordance with embodiments of the present technology, the processor 104 is further configured to execute an image noise determinator 114 and an OCR suitability classifier 116. Each of the image noise determinator 114 and the OCR suitability classifier 116 can be executed in software, hardware, firmware or a combination thereof. Functionality of the image noise determinator 114 and the OCR suitability classifier 116 will now be explained in greater detail with reference to non-limiting embodiments thereof.

Image Noise Determinator 114

In accordance with non-limiting embodiments of the present technology, the image noise determinator 114 is configured to generate an image noise parameter, the image noise parameter (broadly speaking) is indicative of the image noise level present in the captured digital image.

Figure 3:
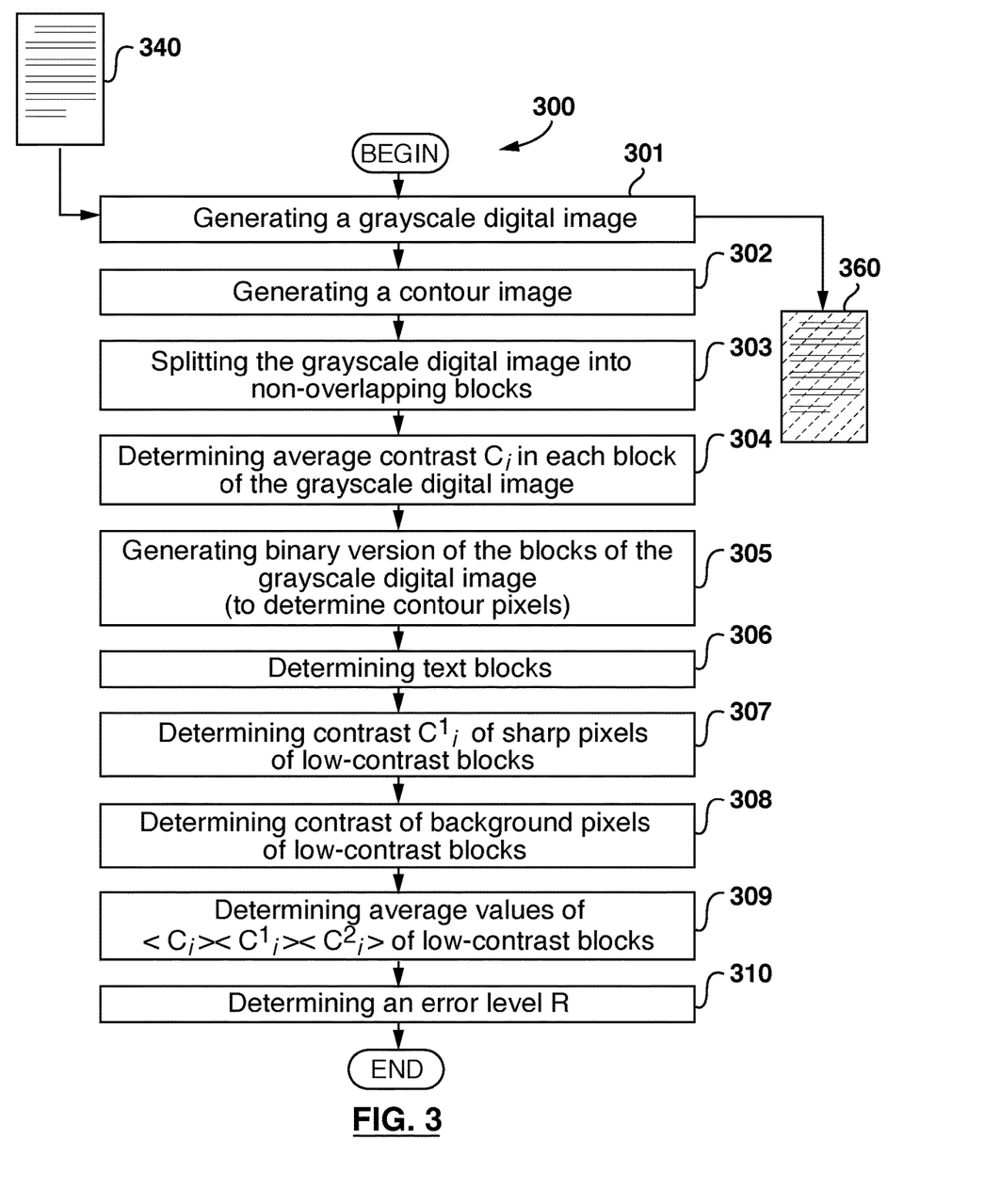
FIG. 3 depicts a block diagram of a non-limiting embodiment of a process for determining an OCR suitability parameter using the trained OCR suitability classifier of FIG. 2 and further schematically depicts inputs into and outputs from certain steps of the process for determining an OCR suitability parameter using the trained OCR suitability classifier of FIG. 2.

How the image noise determinator 114 determines the image noise level parameter will be explained in greater detail herein below with reference to FIG. 3.

OCR Suitability Classifier 116

Broadly speaking, the OCR suitability classifier 116 is configured to determine an OCR suitability parameter associated with the digital document to be possibly submitted for processing to the OCR function 113, 118. The OCR suitability parameter is indicative of whether the digital document is suitable for producing a suitable outcome of the OCR function 113, 118. In other words, OCR suitability parameter is indicative of whether the digital document is suitable to produce a recognized-text digital document containing digital text representative of the text 142 with an acceptable quality (such as, for example, a pre-determined error margin which can be indicative of an acceptable number or ratio of errors per page or per entire document).

In some embodiments of the present technology, the pre-determined error margin can be between one and three percent level of errors. In other embodiments, the pre-determined error margin can be between predefined percent level of errors, as an example zero and two percent. In yet further embodiments; the pre-determined error margin can be a numerical value of a maximum number of errors per page of the recognized-text digital document or per the entirety of the recognized-text digital document.

In some non-limiting embodiments of the present technology, the OCR suitability classifier 116 can be implemented as a machine learning algorithm (MLA). In alternative embodiments of the present technology, the OCR suitability classifier 116 can be implemented as a regression analysis, a heuristic analysis based classifier, and the like.

In those embodiments where the OCR suitability classifier 116 is implemented as the MLA, the MLA can be implemented as a supervised learning or a semi-supervised learning based MLA. As a non-limiting list of examples, the MLA can be implemented as:

Random Forests (or random decision forests);
Artificial neural network;
Bayesian statistics;
Back propagation;
Gaussian process regression;
Decision trees;
Nearest Neighbour Algorithm;
Support Vector Machine;
and the like.

In those embodiments, where the OCR suitability classifier 116 is implemented as a machine learning algorithm, the OCR suitability classifier 116 needs to be trained and validated before it can be used.

Training Phase of the OCR Suitability Classifier 116

Figure 2:
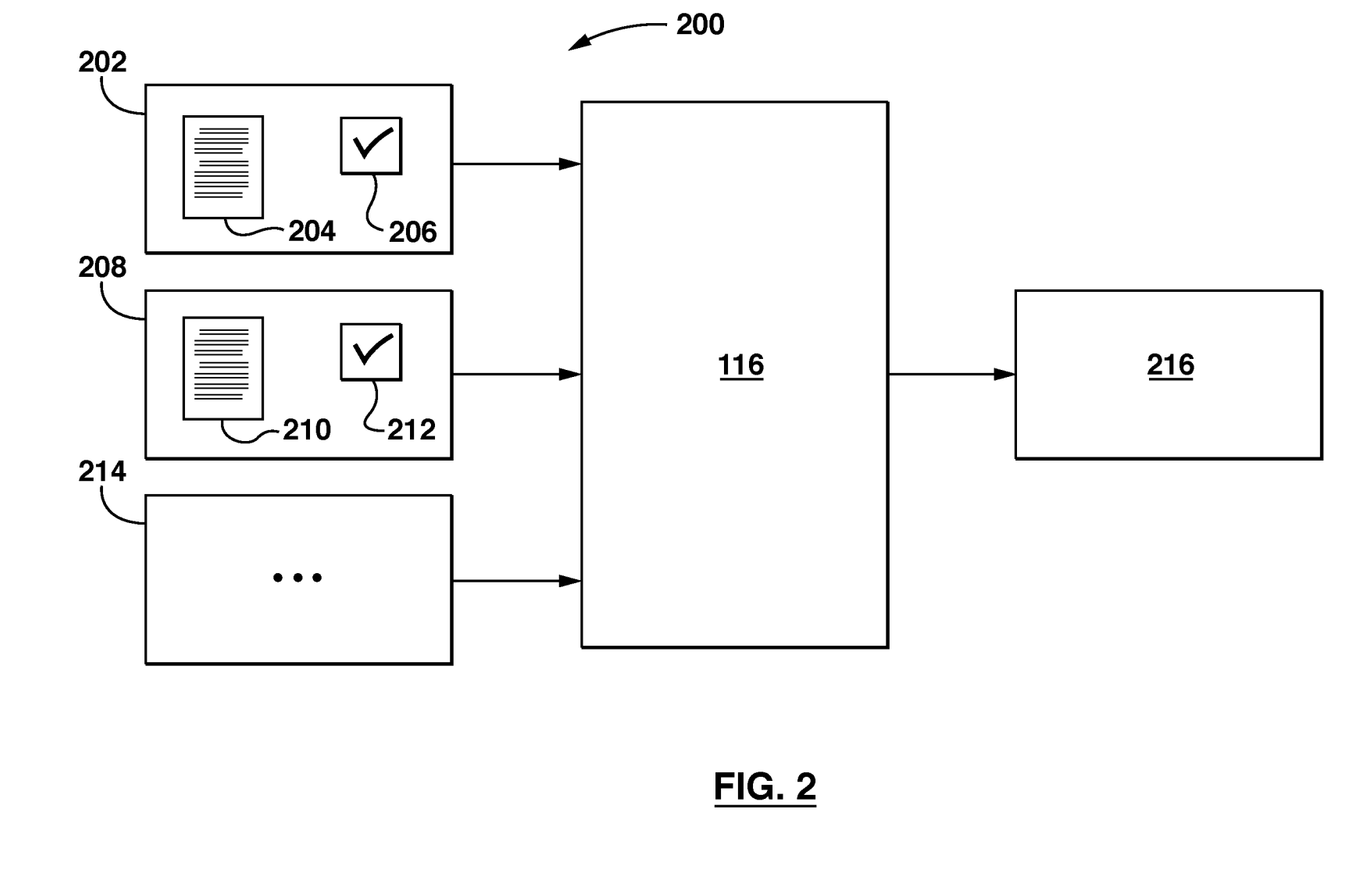
FIG. 2 depicts a schematic representation of training of an OCR suitability classifier of the system of FIG. 1.

FIG. 2 depicts a schematic representation of training of the OCR suitability classifier 116.

Training of the OCR suitability classifier 116 is executed using a set of training objects 200, including a first training object 202, a second training object 208 and a plurality of additional training objects 214. The number of training objects within the plurality of additional training objects 214 is not particularly limited, but generally includes a number of training objects, each training object in the number of training objects including a training digital image with an associated training label.

More specifically, the first training object 202 includes a first training digital image 204 and a first assigned label 206. The first training digital image 204 is associated with a first predicted image noise parameter determined by the image noise determinator 114. From the perspective of the MLA, the first predicted image noise parameter is a "feature" of the first training digital image 204. The first assigned label 206 is representative of a level of errors associated with an output of the OCR function 113, 118 performed on the first training digital image 204.

The second training object 208 includes a second training digital image 210 and a second assigned label 212. The second training digital image 210 is associated with a second predicted image noise parameter determined by the image noise determinator 114. From the perspective of the MLA, the second predicted image noise parameter is a "feature" of the second training digital image 210. The second assigned label 212 is represented by a level of errors associated with an output of the OCR function 113, 118 performed on the second training digital image 210.

As part of the training phase, the OCR suitability classifier 116 generates an MLA formula 216—an algorithm that is used for predicting a target (i.e. the OCR suitability parameter) based at least on the image noise parameter associated with the digital image submitted for processing to the OCR suitability classifier 116.

In some embodiments of the present technology, the outputted target (i.e. the OCR suitability parameter) is associated with a probability indicator.

The OCR suitability parameter and/or the probability indicator can be compared to a predetermined threshold. If the OCR suitability parameter and/or the probability indicator are above the pre-determined threshold, the digital image being processed is determined to be suitable for the OCR function 113, 118. If on the other hand, the OCR suitability parameter is below the pre-determined threshold, the processed digital image is determined not to be suitable for the OCR function 113, 118. The pre-determined threshold can be for example, 1-2% or any other suitable value.

Validation of the OCR Suitability Classifier 116

Once the OCR suitability classifier 116 is trained, a validation phase of the OCR suitability classifier 116 commences.

In order to execute the validation phase, the OCR suitability classifier 116 is presented with a plurality of validation objects. A given validation object can be similar to the first training object 202 and/or the second training object 208 (albeit having content of the digital images not yet seen by the OCR suitability classifier 116).

More specifically, a given validation document is submitted to the OCR suitability classifier 116. The OCR suitability classifier 116 using the trained MLA formula 216, analyzes image features of the given validation document (including the image noise parameter) and outputs a prediction as to the OCR suitability parameter. The outputted prediction is then compared with the assigned label (i.e. ground truth label for the given validation document) for the given validation document and any errors in prediction are fed back into the OCR suitability classifier 116. The validation and re-training processes are repeated until the errors (either number of errors or the margin of error) fall below a pre-determined acceptable error threshold (based on a validation metric).

The type of the validation metric used is not limited and depends on what type of the OCR suitability classifier 116 is used. Some examples of the validation metric include: precision metric, recall metric, F-measure metric and the like. It is believed that validation metric types are well known to those of ordinary skill in the art and, as such, they will not be described herein at length.

Process for Determining the OCR Suitability Parameter

One example of the process for determining the OCR suitability parameter is described in a co-owned U.S. patent application bearing an application Ser. No. 15/165,512 entitled "METHOD AND SYSTEM THAT DETERMINE [S] THE SUITABILITY OF A DOCUMENT IMAGE FOR OPTICAL CHARACTER RECOGNITION AND OTHER IMAGE PROCESSING" and filed with the United States Patent and Trademark Office (USPTO) on May 26, 2016; content of which application is hereby incorporated by reference in its entirety in all those jurisdictions where such incorporation is permitted by law.

In accordance with embodiments of the present technology, the process described in the above referenced US patent application can be modified. One example of the modified process will be described briefly herein below. With reference to FIG. 3 there is depicted a block diagram of a non-limiting embodiment of a process 300 for determining the OCR suitability parameter. FIG. 3 further schematically depicts inputs into and outputs from certain steps of the process 300. It is noted that the image noise determinator 114 can execute the process 300.

Step 301—Generating a Grayscale Image

At step 301, the image noise determinator 114 receives a digital image 340 to be processed by the OCR function 113, 118. In some embodiments of the present technology, the digital image 340 may have been generated using the image-capturing interface 103. In alternative non-limiting embodiments of the present technology, the digital image 340 may have been previously stored and thereafter retrieved from the data storage device 106. In yet alternative non-limiting embodiment, the digital image 340 may have been received via the communication network 110.

Suffice it to say that the digital image 340 may contain a digital image of the printed document 140 or other digital image containing text.

The image noise determinator 114 then processes the digital image 340 to generate a grayscale digital image 360. The conversion of the digital image 340 to the grayscale digital image 360 can be executed using any known technique. One example of such technique of generating the grayscale digital image 360 is disclosed in the above-referenced co-owned U.S. patent application bearing an application Ser. No. 15/165,512 entitled "METHOD AND SYSTEM THAT DETERMINE[S] THE SUITABILITY OF A DOCUMENT IMAGE FOR OPTICAL CHARACTER RECOGNITION AND OTHER IMAGE PROCESSING" and filed with the United States Patent and Trademark Office (USPTO) on May 26, 2016; content of which application is hereby incorporated by reference in its entirety in all those jurisdictions where such incorporation is permitted by law.

It should be noted, however, that generation of the grayscale digital image 360 is an optional step and, as such, can be omitted in alternative embodiments of the present technology. In those alternative embodiments, the digital image 340 can be used instead.

Step 302—Generating a Contour Image

At step 302, the image noise determinator 114 generates a contour image. In accordance with embodiments of the present technology, the image noise determinator 114 generates a single instance of the contour image.

In some embodiments of the present technology, as part of step 302, the grayscale digital image 360 is filtered using, as an example, an edge detection algorithm (such as Sobel-Feldman operator, a.k.a. Sobel filter (−1, 0, 1)).

Step 303—Splitting the Grayscale Digital Image into Non-Overlapping Blocks

At step 303, the image noise determinator 114 splits the grayscale digital image 360 into non-overlapping blocks. The size of the non-overlapping blocks is selected such that the brightness, noise and blur do not significantly vary within a given block.

Step 304—Determining Average Contrast $C_i$ in Each Block of the Grayscale Digital Image At step 304, the image noise determinator 114 determines an average contrast value $C_i$ (where i represents an identifier of an associated block) associated with the grayscale digital image 360.

In some embodiments of the present technology, the image noise determinator 114 executes a histogram-based analysis for determining the contrast value $C_i$ for the given block defined in step 303. More specifically, in some embodiments of the present technology, the image noise determinator 114 generates a brightness histogram. Using the brightness histogram, the image noise determinator 114 determines a minimum and a maximum value of the brightness value such that 0.1% of all pixels of a given block have brightness lesser than the minimum value and 0.1% of all pixels of the given block have brightness higher than the maximum.

The average contrast value $C_i$ is determined as a difference between the maximum value and the minimum value.

Step 305—Generating Binary Version of the Blocks of the Grayscale Digital Image (to Determine Contour Pixels)

At step 305, for each block i, the image noise determinator 114 generates a binarized version of the grayscale digital image 360.

In some embodiments, the binarization is executed using an intensity-value-based thresholding algorithm. More specifically, a binarization threshold th of a half-sum of the maximum brightness value $C_{max}$ and the minimum brightness value $C_{min}$ of a given block can be used for the binarization process:

$$th = \tfrac{1}{2}(C_{min} + C_{max}) \qquad \text{(Formula 1)}$$

The image noise determinator 114 then determines the number K of binarized contour pixels of the binarized image within the given block i. As an example, a black pixel can be determined to be a contour pixel if it has a neighboring white pixel (in either a vertical or horizontal direction) and the number of the most probable contour pixels in a surrounding area of, as an example, 3×3 is less than, as an example, 7.

Step 306—Determining Text Blocks

At step 306, the image noise determinator 114 determines text blocks. In some embodiments of the present technology, the image noise determinator 114 identifies text blocks based on at least some of: (I) with the contour binary pixels exceeding a pre-determined proportion of all pixels in the given block (such as 3-5%) and (ii) with the ratio of black pixels (or white pixels in case the image so a inverted text) in the binarized image generated in step 305 being lower than a predetermined threshold P (the pre-determined threshold P can be, as an example, 20-30%) and (iii) contrast $C_i$ value to be below a pre-determined level.

The image noise determinator 114 then determines a subset of text blocks that are low-contrast text blocks. In some embodiments, the image noise determinator 114 compares the average contrast $C_i$ to a pre-determined contrast threshold. In some embodiments of the present technology, the value of the pre-determined contrast threshold is empirically determined. In other embodiments of the present technology, the value of the pre-determined contrast threshold is pre-set by an operator (not depicted) of the system 100. In yet further embodiments of the present technology, the value of the pre-determined contrast threshold is determined by a dedicated machine learning algorithm (not depicted).

In accordance with embodiments of the present technology, the remainder of the process 300 is performed only with the subset of text blocks that have been determined to be low-contrast text blocks and the remainder of the text blocks is not considered in the remainder of the process 300.

Step 307—Determining Contrast $C^1_i$ of Sharp Pixels of Low-Contrast Blocks At step 307, the image noise determinator 114 determines the contrast $C^1_i$ by decreasing the value down from the value 255 until the sum of the number of sharp pixels in the contour image corresponding to the currently considered block is greater than or equal to the number of contour pixels K computed from the binary version of the given block.

Step 308—Determining Contrast of Background Pixels $C^2_i$ of Low-Contrast Blocks At step 308, the image noise determinator 114 determines the contrast of background pixels $C^2_i$ such that the sharpness value of the contour image does not exceed:

$$C^2_i < C^1_i \qquad \text{(Formula 2)}$$

The value of $C^2_i$ can be determined for each block identified at step 303. How the value of $C^2_i$ is determined is not particularly limited. As an example, the value of $C^2_i$ can be determined as a number of noisy (i.e. erroneous) contour pixels the brightness of which erroneously exceeded $C^2_i$ in the background areas As a specific example, the value of $C^2_i$ can be determined as follows.

First, the image noise determinator 114 determines a number of background binary pixels of the binarized digital image created at step 305. The number of the background binary pixels can be determined by subtracting the number of contour pixels K from the total number of pixels in the given block.

Secondly, the value of the $C^2_i$ is determined by increasing the value up from zero until the number of background pixels of the contour image becomes equal to or for the first time exceeds a pre-defined proportion P of the number of background binary pixels of the given block. The pre-defined proportion P is determined by iteratively maximizing the preciseness of the binary proposed algorithm of determining the OCR suitability parameter.

Step 309—Determining an Average Values of $<C_i><C^1_i><C^2_i>$ of Low-Contrast Blocks The image noise determinator 114 then determines the average values of $<C_i><C^1_i><C^2_i>$ among all low-contrast blocks. The use the average values of $<C_i><C^1_i><C^2_i>$ will be explained in more detail herein below.

Step 310—Determining an Error Level R

At step 310, the image noise determinator 114 determines the error level R of the contour image. In a specific implementation of the present technology, the OCR suitability classifier 116 determines the error level R as:

$$R = <C^1_i>/<C^2_i> \qquad \text{(Formula 3)}$$

Broadly speaking, the error level R is calculated as a proportion of signal to noise, where signal is represented as contrast of contour pixels and the noise is represented as contrast of the background pixels.

In accordance with embodiments of the present technology, the error level R can be used for generating the OCR suitability parameter (i.e. to predict the number of errors in a output of the OCR function using the digital image that is associated with the error level R representing the binarized image defects evaluation). The error level R can, thus, be said to be representative of the level of noise of the low-contrast areas of the digital image.

In addition to the error level R, the following features can be used for determining the OCR suitability parameter:

$<C_i>$
$<C^1_i>$
$<C^2_i>$
the number of text blocks
the number of low-contrast text blocks
a ratio of low-contrast text blocks to the total number of text blocks
etc.

Additionally, the generation of the OCR suitability parameter can use features of the binarized digital image generated at step 305.

Without being so limited, the image noise determinator 114 can use the following features of the binarized digital image:

histogram of the RLE-line sizes
features of the linked components
a ratio of comparatively small black or white lines/components
size of the RLE-lines
font size
distribution of the RLE-lines or font sizes
etc.

It is noted that the error level R can be used by the OCR suitability classifier 116 to predict that the given digital image is suitable for OCR processing 113, 118. The OCR suitability classifier 116 can implement a classifier (that has been trained as disclosed herein) to determine the level of OCR errors of the noisy, low-contrast digital image. Alternatively, the OCR suitability classifier 116 can implement a regression analysis (that has been trained as disclosed herein) to determine the level of OCR errors of the noisy, low-contrast digital image.

It is also noted that even though the functionality of the image noise determinator 114 and the OCR suitability classifier 116 has been described as separate entities, in alternative embodiments of the present technology, the functionality thereof can be implemented in a single entity.

Modifications to the Process 300

Description of the process 300 presented above is just one example of the implementation thereof. Several modifications are contemplated. A few possible modifications are described herein below.

Alternate Method of Determining $<C^1_i>$ and $<C^2_i>$ (Steps 307 and 308)

In an alternatively implementation of the non-limiting embodiments of the present technology, the image noise determinator 114 can use the histogram of the grayscale digital image 360 and the threshold "th" calculated at step 305. More specifically, the OCR suitability classifier 116 calculates an average value M1 and a variance sigma1 (σ1) or pixels which have brightness lower than th.

The image noise determinator 114 then calculates an average value M2 and the variance sigma2 (σ2) for pixels that have brightness that is equal or above th. The image noise determinator 114 then calculates:

$$C^1_i = M2 - M1 \quad \text{(Formula 4)}$$

$$C^2_i = \max(\text{sigma1}, \text{sigma 2}) \quad \text{(Formula 5)}$$

In yet additional non-limiting embodiments of the present technology, the threshold th can be iteratively refined in order to generate most optimal values for M1 and M2. More specifically (but without being so limited), the image noise determinator 114 can execute the following iterations.

First Iteration

During the first iteration, the M1 and M2 are calculated as described immediately above.

Second Iteration

During the second iteration, the threshold th is selected as following:

$$th_1 = (M1 + M2)/2 \quad \text{(Formula 6)}$$

The image noise determinator 114 then uses the $th_1$ calculated using the Formula 6 to recalculate the new values of M1 and M2 for the threshold $th_1$.

N-th Iteration

The image noise determinator 114 repeats the iterations similar to the second iterations until the changes in $M1_i$ and $M2_i$ after an $i^{th}$ iteration are below a pre-determined threshold calculated as:

$$\max(\text{abs}(M1_i - M1(i-1)), \text{abs}(M2_i - M2(i-1))) < 2 \quad \text{(Formula 7)}$$

For the given threshold the image noise determinator 114 calculates sigma1, sigma2 as was described above.

Alternate Determining an Average Values of $<C_i>, <C^1_i>, <C^2_i>$ of Low-Contrast Blocks (Step 309)

In alternative embodiments of the process 300, the image noise determinator 114 determines a quality parameter:

$$R_I = <C^1_i>/<C^2_i> \quad \text{(Formula 8)}$$

The image noise determinator 114 can further determine statistical information in regard to $<C_i>, <C^1_i>, <C^2_i>, <R_i>, \min(R_i)$ for all low-contrast blocks.

Alternate Method of Calculating Error Level R (Step 310)

As part of step 310, in alternative embodiments of the present technology, the image noise determinator 114 can compare the error level R to the statistical information determined at step 309 ($<C_i>, <C^1_i>, <C^2_i>, <R_i>, \min(R_i)$).

In addition, the statistical information determined at step 309 ($<C_i>, <C^1_i>, <C^2_i>, <R_i>, \min(R_i)$) can also be used for determining the OCR suitability parameter by the OCR suitability classifier 116.

Figure 4:
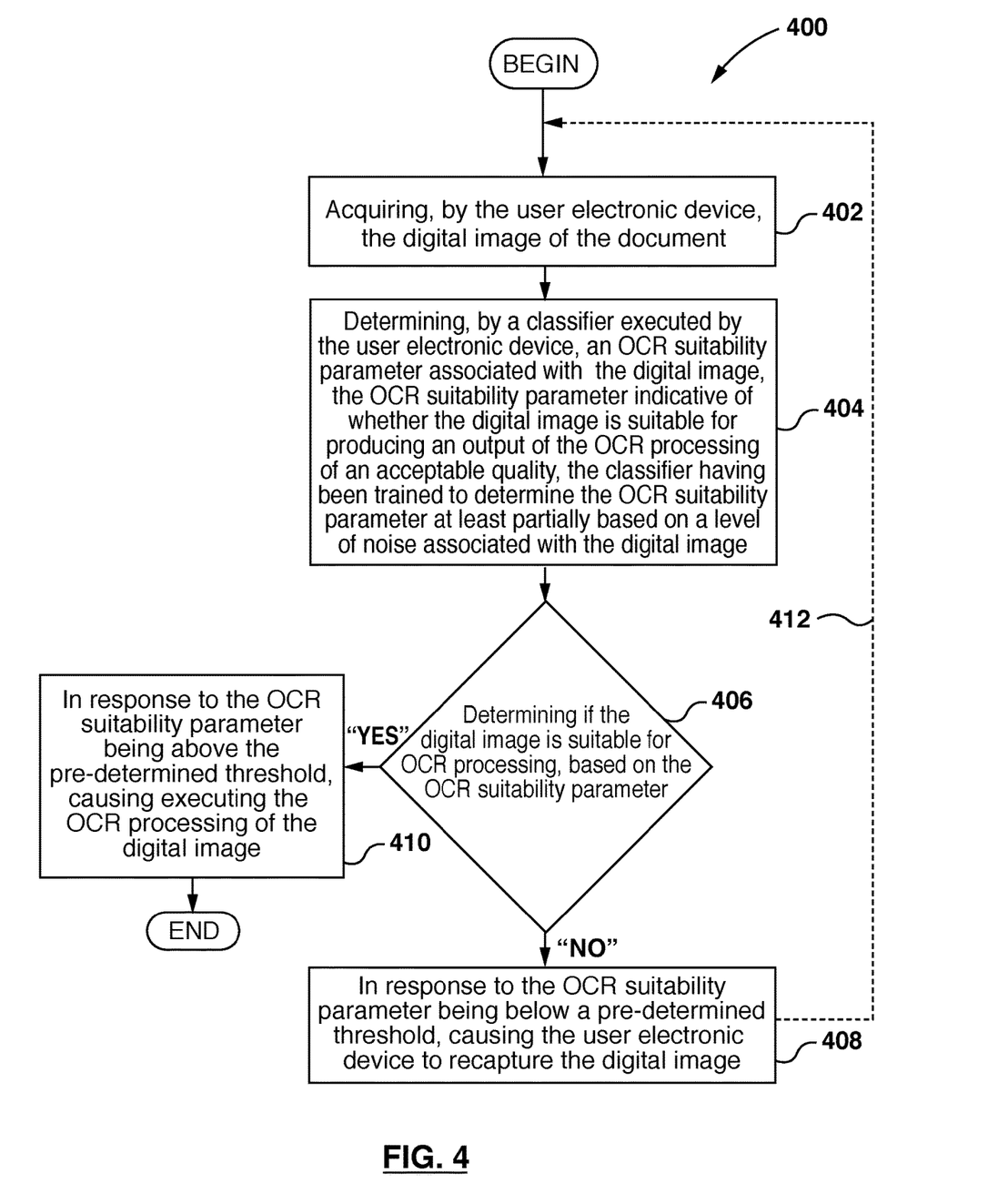
FIG. 4 depicts a non limiting embodiment of a block diagram of a method of determining a document suitability for OCR processing, the method executable by the OCR suitability classifier once trained by the process of FIG. 2.

Given the architecture described above, it is possible to execute a method of determining document suitability for, as an example, server-based OCR processing. With reference to FIG. 4, there is depicted a non-limiting embodiment of a block diagram of a method 400 of analyzing a digital image. The method 400 can be executed, for example, for determining the document suitability for OCR processing 113, 118.

The processor 104 can execute the method 400. More specifically, the steps of the method 400 can be executed by the image noise determinator 114 and by the OCR suitability classifier 116, as was described above, Step 402—Acquiring by the User Electronic Device, the Digital Image of the Document The method 400 starts at step 402, where the image noise determinator 114 acquires the digital image 340 of the printed document 140.

More specifically, the image noise determinator 114 receives the digital image 340 to be processed by the OCR function 113, 118. In some embodiments of the present technology, the digital image 340 may have been generated using the image-capturing interface 103. In alternative non-limiting embodiments of the present technology, the digital image 340 may have been previously stored and thereafter retrieved from the data storage device 106. In yet another alternative non-limiting embodiment, the digital image 340 may have been received via the communication network 110.

In some embodiments, the image noise determinator 114 receives the digital image 340 to be processed by the OCR function 113, 118 via an OCR application interface (not depicted).

Step 404—Determining, by a Classifier Executed by the User Electronic Device, an OCR Suitability Parameter Associated with the Digital Image, the OCR Suitability Parameter Indicative of Whether the Digital Image is Suitable for Producing an Output of the OCR Processing of an Acceptable Quality, the Classifier Having been Trained to Determine the OCR Suitability Parameter at Least Partially Based on a Level of Noise Associated with the Digital Image At step 404, the OCR suitability classifier 116 determines an OCR suitability parameter associated with the digital image 340, the OCR suitability parameter indicative of whether the digital image 340 is suitable for producing an output of the OCR processing of an acceptable quality, the OCR suitability classifier 116 having been trained to determine the OCR suitability parameter at least partially based on a level of noise (determined by the image noise determinator 114) associated with the digital image 340. In some embodiments of the present technology, the OCR suitability classifier 116 has been trained using the training process described above with reference to FIG. 2.

As has been alluded to above, embodiments of the present technology contemplate various approaches to determining the OCR suitability parameter.

In some implementations of the method 400, the step of determining the OCR suitability parameter comprises:

generating, from a grayscale digital image version of the digital image, a contour image;

splitting a grayscale digital image into non-overlapping blocks;

determining an average contrast $C_i$ in each block of the grayscale digital image;

generating a binary version of the non-overlapping blocks of the grayscale digital image in order to determine contour pixels;

determining text blocks;

determining contrast $C^1_i$ of sharp pixels of low-contrast blocks;

determining contrast $C^2_i$ of background pixels of low-contrast blocks;

determining an average values of $<C_i><C^1_i><C^2_i>$ of low-contrast blocks;

determining an error level R.

In some implementations of the method 400, the error level R is used as the OCR suitability parameter.

In some implementations of the method 400, generating the contour image comprises applying a filter to the grayscale digital image.

In some implementations of the method 400, the filter is an edge detection algorithm (such as a Sobel filter (−1, 0, 1) or the like).

In some implementations of the method 400, the splitting the grayscale digital image into non-overlapping blocks comprises selecting a size of the non-overlapping blocks such that brightness, noise and blur do not significantly vary within a given block.

In some implementations of the method 400, the determining an average contrast $C_i$ in each block of the grayscale digital image comprises executing a histogram-based analysis for determining the contrast value $C_i$ for the given block.

In some implementations of the method 400, the executing the histogram-based analysis comprises generating a brightness histogram, and wherein the method further comprises identifying a minimum and a maximum value of a brightness value such that 0.1% of all pixels of the given block have brightness lesser than the minimum value and 0.1% of all pixels of the given block have brightness higher than the maximum.

In some implementations of the method 400, the determining the average contrast $C_i$ in each block further comprises determining a difference between determining maximum value and the minimum value.

In some implementations of the method 400, the generating binary version of the blocks of the grayscale digital image in order to determine contour pixels comprises applying a binarization threshold of a half-sum of the maximum brightness value and the minimum brightness value of a given block using:

$$th = \frac{1}{2}(C_{min} + C_{max})$$

In some implementations of the method 400, the method 400 further comprises determining a number K of binarized contour pixels of the binarized image within the given block.

In some implementations of the method 400, the determining text blocks comprises determining a given text block based on at least one of: (i) contour binary pixels exceeding a pre-determined proportion of all pixels in the given block, (ii) a ratio of black pixels in the binarized image being lower than a predetermined threshold and (iii) a contrast $C_i$ value to be below a pre-determined level.

In some implementations of the method 400, the method 400 further comprises selecting a subset of low-contrast text blocks.

In some implementations of the method 400, the determining contrast $C^1_i$ of sharp pixels of low-contrast blocks comprises determining the contrast $C^1_i$ by decreasing a value thereof down from a value 255 until a sum of the number of sharp pixels in the contour image corresponding to a given block is greater than or equal to a number of contour pixels K computed from the binary version of the given block.

In some implementations of the method 400, the determining contrast of background pixels $C^2_i$ of low-contrast blocks comprises determining the value of $C^2_i$ as a number of noisy contour pixels the brightness of which erroneously exceeded $C^2_i$ in the background areas.

In some implementations of the method 400, the determining contrast of background pixels $C^2_i$ of low-contrast blocks comprises determining a number of background binary pixels of the binarized digital image by subtracting a number of contour pixels K from a total number of pixels in the given block.

In some implementations of the method 400, the method 400 further comprises determining the value of the $C^2_i$ by increasing the value up from zero until a number of the background pixels of the contour image becomes equal to or for the first time exceeds a pre-defined proportion P of the number of background binary pixels of the given block.

In some implementations of the method 400, the determining an error level R comprises determining the error level R as:

$$R = <C^1_i>/<C^2_i>$$

In some implementations of the method 400, the determining the error level R further comprises using statistical information:

$$(<C_i>, <C^1_i>, <C^2_i>, <R_i>, \min(R_i)).$$

Step 406—Determining if the Digital Image is Suitable for OCR Processing, Based on the OCR Suitability Parameter At step 406 the OCR suitability classifier 116 determines if the digital image 340 is suitable for OCR processing, based on the OCR suitability parameter. In some embodiments of the present technology the OCR suitability classifier 116 compares the so-determined OCR suitability parameter to a pre-determined threshold. In some embodiments of the present technology the pre-determined threshold is pre-determined by an operator of the system 100, based for example, on empirical tests. Alternatively, the pre-determined threshold can be generated by a dedicated machine learning algorithm (not depicted).

Step 408—in Response to the OCR Suitability Parameter being Below a Pre-Determined Threshold, Causing the User Electronic Device to Re-Acquire the Digital Image At step 408, in response to the OCR suitability parameter being below the pre-determined threshold (the "NO" branch of step 406), the OCR suitability classifier 116 executes causing the user electronic device 102 to re-acquire the digital image 240.

In some embodiments of the present technology, the causing the user electronic device 102 to re-acquire the digital image 240 comprises providing a prompt to the user (not depicted) of the user electronic device 102 to recapture the digital image 340. Alternatively and additionally, the causing the user electronic device 102 to re-acquire the digital image 240 comprises providing an additional prompt to the user (not depicted) of the user electronic device 102, the additional prompt indicative of how to recapture the digital image 340 (for example, to turn on the flash, to bring the user electronic device 102 closer to the printed document 140, etc.). In some embodiments of the present technology, the additional prompt is based on a library of additional prompts, each of the additional prompts being correlated for example, to a delta between the OCR suitability parameter and the pre-determined threshold.

Alternatively, the causing the user electronic device 102 to re-acquire the digital image 240 comprises promoting the user to cause the user electronic device 102 to download another digital image 240.

In some embodiments of the present technology, the method 400 then reverts to execution of step 402 (depicted in FIG. 4 at 412), whereby step 402 is executed with the newly acquired digital image (not depicted). The loop depicted at step 412 can be repeated until a given newly acquired digital image is identified as being suitable for OCR processing at step 406 and is OCR processed at step 410.

Step 410—in Response to the OCR Suitability Parameter being Above the Pre-Determined Threshold, Causing Executing the OCR Processing of the Digital Image At step 410, in response to the OCR suitability parameter being above the pre-determined threshold (the "YES" branch of step 406), the OCR suitability classifier 116 executes causing executing the OCR processing of the digital image 340.

In some implementations of the method 400, the step of causing executing the OCR processing comprises executing, by the user electronic device 102, the locally-executed OCR function 118 to generate a recognized text digital document (not depicted) representative of a text contained in the printed document 140.

In other implementations of the method 400, the step of causing executing the OCR processing comprises transmitting, by the user electronic device 102, to the server 112 (the server 112 configured to execute a server-based OCR function 113) to (i) generate a recognized text digital document (not depicted) representative of a text contained in the printed document 140 and (ii) transmit the recognized text document to the user electronic device 102.

The method 400 then terminates.

It should be expressly understood that not all technical effects mentioned herein need to be obtained in each and every embodiment of the present technology. For example, embodiments of the present technology may be implemented without the user receiving the benefit some of these technical effects, while other embodiments may be implemented with the user obtaining other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of analyzing a digital image, the method executable by a user electronic device; the method comprising:
   acquiring, by the user electronic device, the digital image of a document;
   determining, by a classifier executed by the user electronic device, an optical character recognition (OCR) suitability parameter associated with the digital image and whether the OCR suitability parameter is below a predetermined threshold, the OCR suitability parameter being indicative of whether the digital image is suitable for producing an output of an OCR processing of an acceptable quality, wherein determining the OCR suitability parameter comprises determining text blocks in the digital image,
   the classifier having been trained to determine the OCR suitability parameter at least partially based on a level of noise associated with the digital image, wherein the level of noise is determined based at least on a proportion of contrast of sharp pixels of low contrast text blocks to contrast of background pixels of low-contrast text blocks in the digital image; and
   in response to the OCR suitability parameter being below the pre-determined threshold, re-acquiring, by the user electronic device, the digital image.

2. The method of claim 1, wherein the method further comprises, in response to the OCR suitability parameter being above the pre-determined threshold, executing, by the user electronic device, the OCR processing of the digital image.

3. The method of claim 2, wherein executing, by the user electronic device, the OCR processing comprises executing, by the user electronic device, a locally-executed OCR function to generate a recognized text digital document representative of a text contained in said digital image.

4. The method of claim 2, wherein executing, by the user electronic device, the OCR processing comprises transmitting, by the user electronic device, the digital image to a server, the server configured to execute a server-based OCR function to (i) generate a recognized text digital document representative of a text contained in said digital image and (ii) transmit the recognized text document to the user electronic device.

5. The method of claim 1, wherein the classifier is implemented as a machine learning algorithm.

6. The method of claim 5, further comprising training the machine learning algorithm.

7. The method of claim 1, wherein the determining the OCR suitability parameter comprises:
   generating, from a grayscale digital image of the digital image, a contour image;
   splitting the grayscale digital image into non-overlapping blocks;
   determining an average contrast $C_i$ in each block of the grayscale digital image, wherein i represents an identifier of a respective block;
   generating a binary version of the non-overlapping blocks of the grayscale digital image in order to determine contour pixels;
   determining the contrast $C^1_i$ of sharp pixels of low-contrast text blocks;
   determining the contrast $C^2_i$ of background pixels of low-contrast text blocks;
   determining average values of $<C_i><C^1_i, ><C^2_i>$ of low-contrast text blocks;
   determining an error level R representing the level of noise associated with the digital image, the error level R determined based at least on the average values of the contrast of sharp pixels of low contrast text blocks and the average values of the contrast of background pixels of low-contrast text blocks.

8. The method of claim 7, wherein the error level R is used as the OCR suitability parameter.

9. The method of claim 7, wherein said generating the contour image comprises applying a filter to the grayscale digital image.

10. The method of claim 9, wherein the filter is an edge detection algorithm.

11. The method of claim 10, wherein the edge detection algorithm is a Sobel filter.

12. The method of claim 7, wherein said splitting the grayscale digital image into non-overlapping blocks comprises selecting a size of the non-overlapping blocks such that brightness, noise and blur do not significantly vary within a given block.

13. The method of claim 7, wherein said determining an average contrast $C_i$ in each block of the grayscale digital image comprises executing a histogram-based analysis for determining the contrast value $C_i$ for a given block.

14. The method of claim 13, wherein executing the histogram-based analysis comprises generating a brightness histogram, and wherein the method further comprises identifying a minimum and a maximum value of a brightness value such that 0.1% of all pixels of the given block have brightness lesser than the minimum value and 0.1% of all pixels of the given block have brightness higher than the maximum.

15. The method of claim 14, wherein said determining the average contrast $C_i$ in each block further comprises determining a difference between the maximum value and the minimum value.

16. The method of claim 7, wherein said generating binary version of the blocks of the grayscale digital image in order to determine contour pixels comprises applying a binarization threshold of a half-sum of a maximum brightness value and a minimum brightness value of a given block using:

$$th = \tfrac{1}{2}(C_{min} + C_{max}),$$

where:
th is the binarization threshold;
$C_{max}$ is the maximum brightness value; and
$C_{min}$ is the minimum brightness value.

17. The method of claim 16, further comprising determining a number K of binarized contour pixels of the binarized image within the given block.

18. The method of claim 7, wherein said determining text blocks comprises determining a given text block based on at least one of: (i) contour binary pixels exceeding a pre-determined proportion of all pixels in the given block, (ii) a ratio of black pixels in the binarized image being lower than a predetermined threshold and (iii) a contrast $C_i$ value to be below a pre-determined level.

19. The method of claim 18, further comprising selecting a subset of low-contrast text blocks.

20. The method of claim 7, wherein said determining contrast $C^1_i$ of sharp pixels of low-contrast text blocks comprises determining the contrast $C^1_i$ by decreasing a value thereof down from a value 255 until a sum of a number of sharp pixels in the contour image corresponding to a given block is greater than or equal to a number of contour pixels K computed from the binary version of the given block.

21. The method of claim 7, wherein said determining contrast of background pixels $C^2_i$ of low-contrast text blocks comprises determining the value of $C^2_i$ as a number of noisy contour pixels a brightness of which erroneously exceeded $C^2_i$ in the background areas.

22. The method of claim 7, wherein said determining contrast of background pixels $C^2_i$ of low-contrast text blocks comprises:
determining a number of background binary pixels of the binarized digital image by subtracting a number of contour pixels K from a total number of pixels in the given block.

23. The method of claim 22, further comprising determining the value of the $C^2_i$ by increasing a value up from zero until a number of the background pixels of the contour image becomes equal or for the first time exceeds a pre-defined proportion P of the number of background binary pixels of the given block.

24. The method of claim 7, wherein determining an error level R comprises determining the error level R as:

$$R = <C^1_i>/<C^2_i>.$$

25. The method of claim 24, wherein determining the error level R further comprises using statistical information:

$$(<C_i>, <C^1_i>, <C^2_i>, <R_i>, \min(R_i)).$$

26. The method of claim 1, wherein the acquiring by the user electronic device, the digital image of the document is executed via an image-capturing interface of the user electronic device.

27. A user electronic device comprising a processor, the processor configured to:
acquire a digital image of a document; the processor being further configured to:
determine, by executing a classifier, an optical character recognition (OCR) suitability parameter associated with the digital image and whether the OCR suitability parameter is below a predetermined threshold, the OCR suitability parameter being indicative of whether the digital image is suitable for producing an output of an OCR processing of an acceptable quality,
the classifier having been trained to determine the OCR suitability parameter at least partially based on a level of noise associated with the digital image, wherein the level of noise is determined based at least on a proportion of contrast of sharp pixels of low contrast text blocks to contrast of background pixels of low-contrast text blocks in the digital image; and
in response to the OCR suitability parameter being below the pre-determined threshold, re-capture the digital image.

28. A non-transitory computer readable medium storing computer executable instructions, the computer executable instructions, when executed, configured to cause an electronic device associated with the non-transitory computer readable medium to:
acquire a digital image of a document;
determine, by a classifier executed by the user electronic device, an optical character recognition (OCR) suitability parameter associated with the digital image and whether the OCR suitability parameter is below a predetermined threshold, the OCR suitability parameter being indicative of whether the digital image is suitable for producing an output of an OCR processing of an acceptable quality,
the classifier having been trained to determine the OCR suitability parameter at least partially based on a level of noise associated with the digital image, wherein the level of noise is determined based at least on a proportion of contrast of sharp pixels of low contrast text blocks to contrast of background pixels of low-contrast text blocks in the digital image; and
in response to the OCR suitability parameter being below the pre-determined threshold, re-acquire the digital image.

* * * * *